Jan. 6, 1959 C. W. VIETS 2,867,389

SOUND REPRODUCING DEVICE

Filed July 12, 1954 4 Sheets-Sheet 1

INVENTOR.
CHARLES W. VIETS

BY Toulmin & Toulmin

ATTORNEYS

SOUND REPRODUCING DEVICE

Filed July 12, 1954 4 Sheets-Sheet 2

INVENTOR.
CHARLES W. VIETS
BY Toulmin & Toulmin
ATTORNEYS

Jan. 6, 1959 C. W. VIETS 2,867,389

SOUND REPRODUCING DEVICE

Filed July 12, 1954 4 Sheets-Sheet 3

INVENTOR.
CHARLES W. VIETS

BY Toulmin & Toulmin

ATTORNEYS

Jan. 6, 1959 C. W. VIETS 2,867,389

SOUND REPRODUCING DEVICE

Filed July 12, 1954 4 Sheets-Sheet 4

INVENTOR.
CHARLES W. VIETS
BY Toulmin & Toulmin
ATTORNEYS

United States Patent Office 2,867,389

Patented Jan. 6, 1959

2,867,389

SOUND REPRODUCING DEVICE

Charles William Viets, Dayton, Ohio

Application July 12, 1954, Serial No. 442,817

3 Claims. (Cl. 242—55.11)

This invention relates to a sound reproducing device and particularly to a device for reproducing sounds that have been recorded on magnetic tape.

More particularly still, this invention relates to a device for reproducing sounds from magnetic tapes to be used in association with an automobile radio or the like.

It is estimated that there are some thirty-five million radios in automobiles, most of which are turned on regularly to provide the passengers and drivers of the automobiles with entertainment and relaxation.

The scope of an automobile radio has certain limitations imposed thereon due in part to the fact that the most convenient and practical arrangement thereon involves the use of push buttons for tuning and also due to the fact that a radio of this nature necessarily has somewhat limited range. In driving for any distance in an automobile the push buttons ordinarily are not satisfactory because the automobile is soon out of the range of stations to which the push button is tuned thus requiring that the motorist use the tuning knob which is not only inconvenient but a hazard while driving an automobile.

The present invention overcomes the drawbacks of push button tuning in the automobile and also overcomes the drawback of a limited selection of broadcasts which can be obtained in many localities by enabling the motorist to select that type of recording which he prefers and which will be played through an automobile radio.

A particular object of this invention is the provision of a magnetic tape play back system for providing substantially continuous entertainment or information in a unit that can readily and economically be installed in any automotive vehicle.

Another object of this invention is the provision of a magnetic tape play back unit of the nature referred to in which it is simple and convenient to change the recording being played.

A still further object of this invention is the provision of a magnetic tape play back unit which utilizes cartridges containing the tapes to be played thereby making it extremely convenient to change the recordings at any time.

Another particular object of this invention is the provision of a magnetic tape play back unit in which it is not necessary to thread the tape through the unit, this being accomplished merely by inserting a prepared cartridge in the unit.

A still further object of this invention is the provision of a cartridge or magazine containing a magnetic tape or wire adapted for being inserted into a play back unit of the nature referred to.

A still further object of this invention is the provision of a cartridge or magazine containing magnetic tape or wire adapted for being utilized with a play back unit of the nature referred to and which cartridge or magazine is capable of being sealed to prevent tampering with the magnetic element contained therein.

In general, the objects referred to above as well as still other objects of this invention are attained by providing an assembly consisting of two main units. The larger unit is the play back assembly and this unit is mounted in the automotive vehicle, as, for example, beneath the dash and is connected to the automobile radio and is provided with controls for turning it on and off and for adjusting the tone and volume of the sound. A second and smaller unit consists of a magnetic tape magazine which contains two spools with a magnetic tape leading therebetween. This smaller unit is adapted for being detachably mounted in the main unit and when the main unit is turned on whatever is recorded on the magnetic tape will be played through the car radio, or other suitable means.

According to this invention, the magnetic tape is twice as wide as is necessary for reproduction by the sound head of the play back unit which picks up the sound therefrom and the play back unit and the tape magazine are so constructed that the magazine can be inverted in the play back unit after one-half of the tape has been played and the other one-half of the tape then played back thus giving twice the length of time that is normally available from a tape of a predetermined length.

The magnetic tape magazines are of a nature that they can be stocked in filling stations or other places where they will be conveniently accessible to the motorist and new magazines can be had on the exchange basis for a nominal cost, and could even be arranged for dispensing from a coin operated dispensing unit.

The magnetic tapes are of conventional type and are adapted for having any sort of information or entertainment recorded thereon. For example, music of any kind could be recorded on the tapes, or for traveling business men business information or a list of names and addresses or other pertinent business data could advantageously be recorded on the tapes.

The exact nature of this invention will be more clearly understood upon reference to the accompanying drawings in which.

Figures 1, 2, 6:
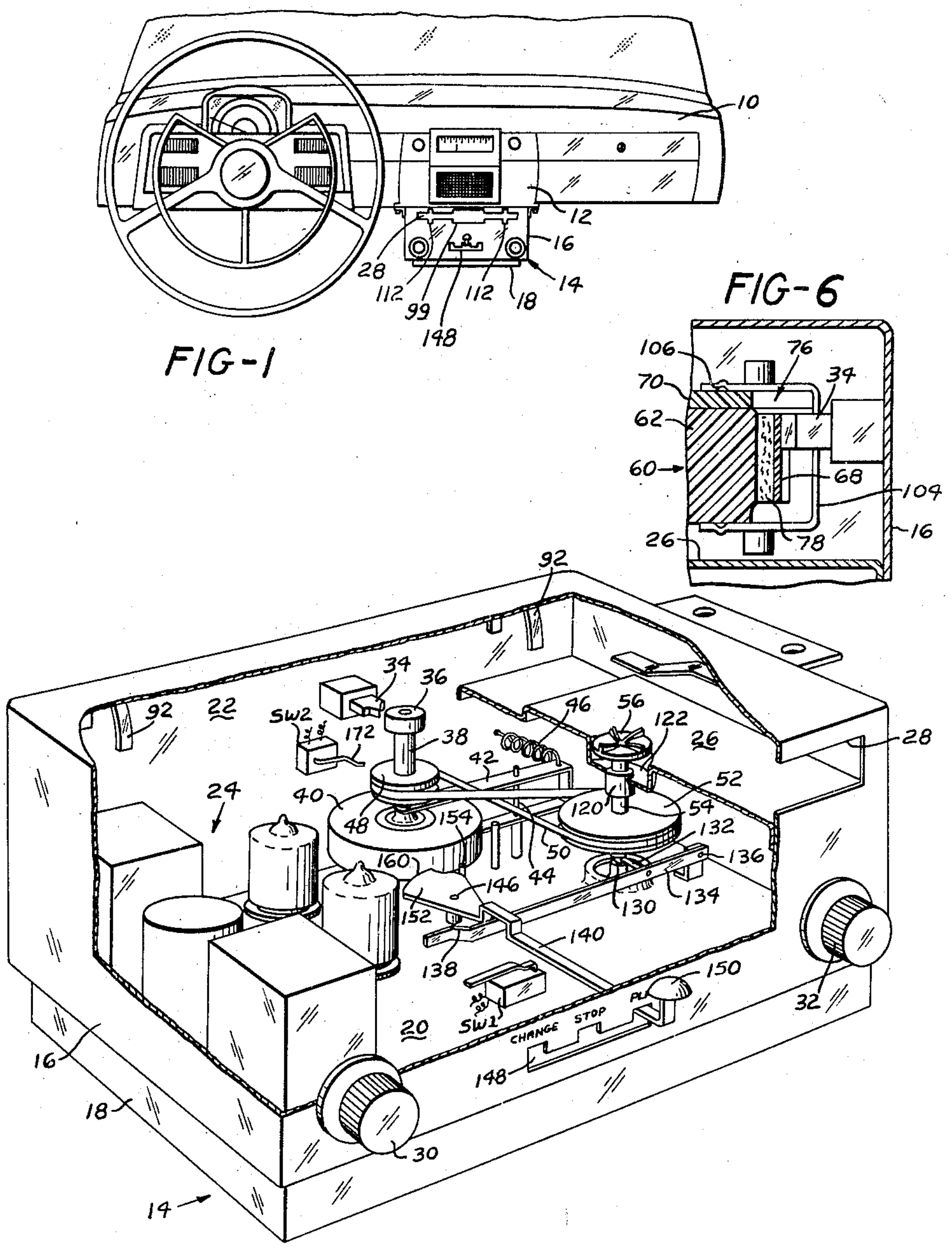
Figure 1 is a perspective view showing a device according to the present invention mounted in an automotive vehicle.
Figure 2 is a perspective view of the main portion of a play back unit partly broken away to show details of construction thereof.
Figure 6 is a fragmentary sectional view indicated by line 6—6 on Figure 3 showing the manner in which the pick-up head of the play back unit is arranged to engage only one half the tape leading from the tape magazine so that each half of the tape can be played separately.

Referring to the drawings more in detail, in particular to Figure 1, there is illustarted therein a portion of an automotive vehicle in which the instrument panel 10 has located therein a conventional automobile radio 12. According to the present invention, there is mounted beneath the instrument panel 10 at some location which will not interfere with the passengers of the vehicle while still being readily accessible to the driver, a device 14 constructed according to the present invention.

The device 14 consists of a play back unit adapted for receiving a cartridge having a magnetic tape therein with the play back unit having means for driving the magnetic tape past a magnetic pick up head and with the impulses detected by the head being converted into audible sound in the loud speaker of the automobile radio or other audible sound system.

Referring now to Figure 2, the play back unit 14 consists of a frame 16 that comprises a lower portion 18 within which may be located components of the electronic circuit of the play back unit such as resistors, condensers, connecting wires and the like.

Larger components of the electronic circuit such as large electrolytic condensers, transformers, tubes and the like may be mounted on the plate 20 forming the top of compartment 18 projecting upwardly into an upper compartment 22 of the play back unit. These larger auxiliaries are generally indicated at 24 in Figure 2 and may be located at one or both ends of the play back unit as individual conditions and preferences may indicate.

The upper compartment 22 of the play back unit is still further divided by a horizontal plate or platform 26 which is adapted for supporting a cartridge of the nature previously referred to which carries the magnetic tape. The front wall of the frame of the play back unit comprises a slot 28 through which the cartridge is introduced into the play back unit for resting on platform 26.

An on-off and volume control 30 and a tone control 32 may be included in the play back unit with the adjustable knobs pertaining thereto being readily accessible from the front of the unit.

Still referring to the Figure 2, it will be noted that toward the back of the space above platform 26 and in about the center thereof there is a magnetic pick up head 34 by means of which the recording on the magnetic tapes is picked up. A drive capstan 36 is located adjacent the pick up head 34. Capstan 36 is mounted on drive shaft 38 of a motor 40 which is carried on the ends of the projecting arms of a bracket 42 that is pivoted on a vertical pivot pin 44. A spring 46 connected between bracket 42 and the frame of the unit on the opposite side of pivot pin 44 from motor 40 continuously urges the motor and the capstan carried thereby toward the front of the play back unit thereby yieldably to engage the capstan with the tape carried by the cartridge that is located in the play back unit.

The shaft 38 of motor 40 carries drive pulley 48 about which passes a slip belt 50 that also passes around a pulley 52 carried by a shaft 54. Shaft 54 is vertically reciprocable in the play back unit and at its upper end carries a drive member 56 engageable with one of the spools of the cartridge that is located within the play back unit. The slip belt connection of pulley 52 with pulley 48 enables the capstan 36 to determine the speed at which the tape moves while continuously over driving shaft 54 so that the tape is always maintained relatively taut between the capstan and the take up spool.

Turning now to Figures 3 through 7, the cartridge previously referred to and which carries the magnetic tape for being played through the play back unit and the associated radio is indicated at 60. This cartridge consists of a main body portion 62 having cylindrical recesses 64 therein within which are mounted the spools 66 that carry the magnetic tape 68. A cover member 70 is firmly secured to the body portion 62 of the cartridge thereby enclosing the spools and the tape carried thereby.

Figure 5:
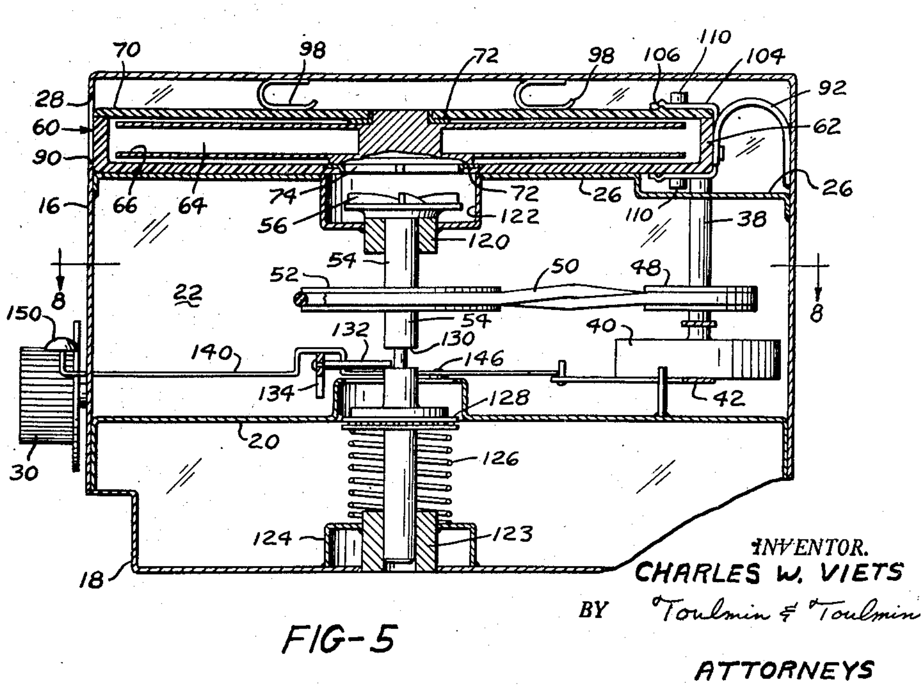
Figure 5 is a sectional view indicated by line 5—5 on Figure 3 showing the drive arrangement for driving one of the spools in the tape magazine.
Figure 7:
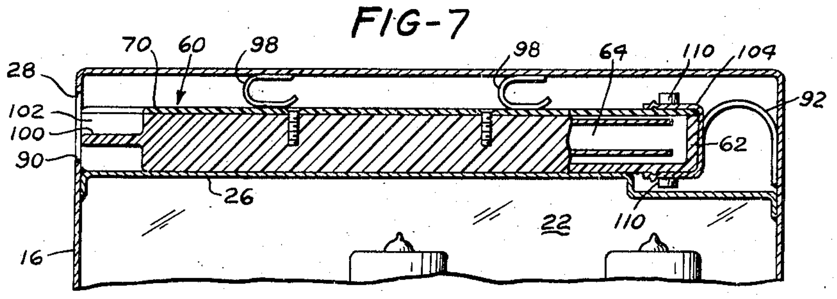
Figure 7 is a sectional view indicated by line 7—7 on Figure 3 showing the manner in which the tape magazine is supported and located in the play back unit.
Figure 8:
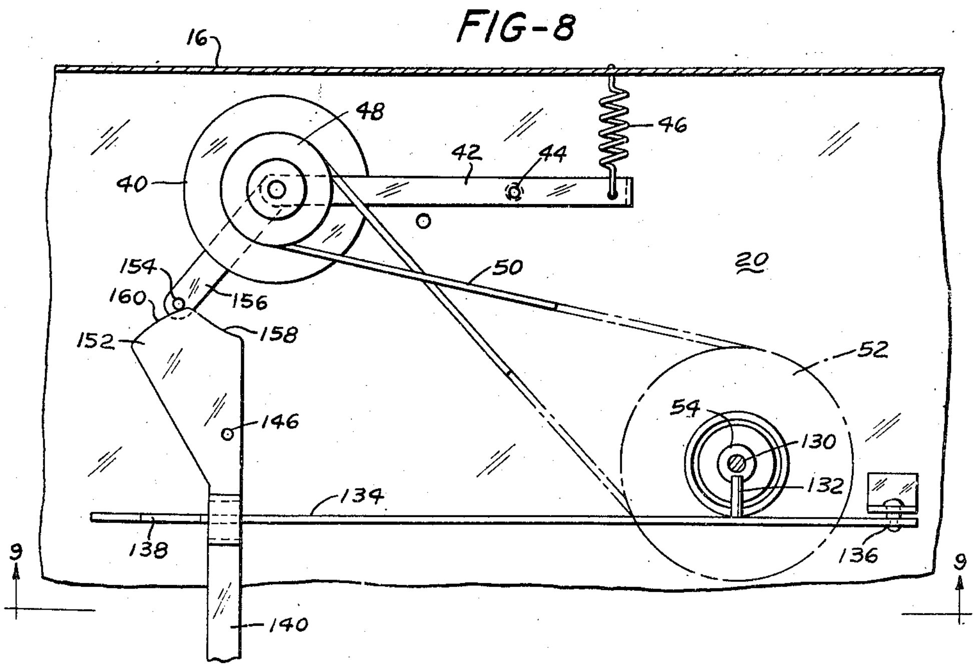
Figure 8 is a plan sectional view indicated by line 8—8 on Figure 5 showing the mounting for the drive motor that drives the tape from the tape magazine and which also drives the spool of the magazine.
Figure 9:
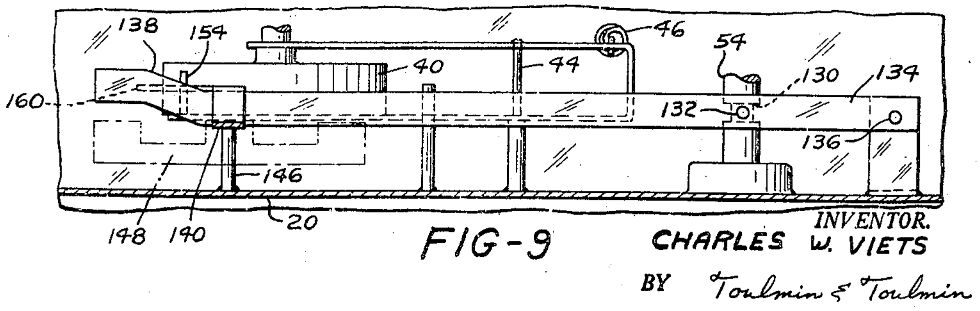
Figure 9 is a sectional view indicated by line 9—9 on Figure 8 showing the shifting arrangement by means of which the drive motor is shifted to and from driving position and by means of which the spool drive is selectively engaged and disengaged.

As will be best seen in Figure 5 the cover member and body portion 62 are apertured for receiving hubs projecting top and bottom from the spools 66. There are preferably provided bushing means as at 72 cooperating with said hubs for holding the spools on a predetermined axis and for preventing axial movement thereof while at the same time permitting relatively free rotation thereof within the cartridge. As will best be seen in Figure 5, one end of the hub of each spool is provided, as at 74, with a recess shaped so as to be complementary to the shape of the drive member 56 previously referred to so that upon upward movement of the drive member it will drivingly engage the adjacent of said spools.

Figures 3, 4:
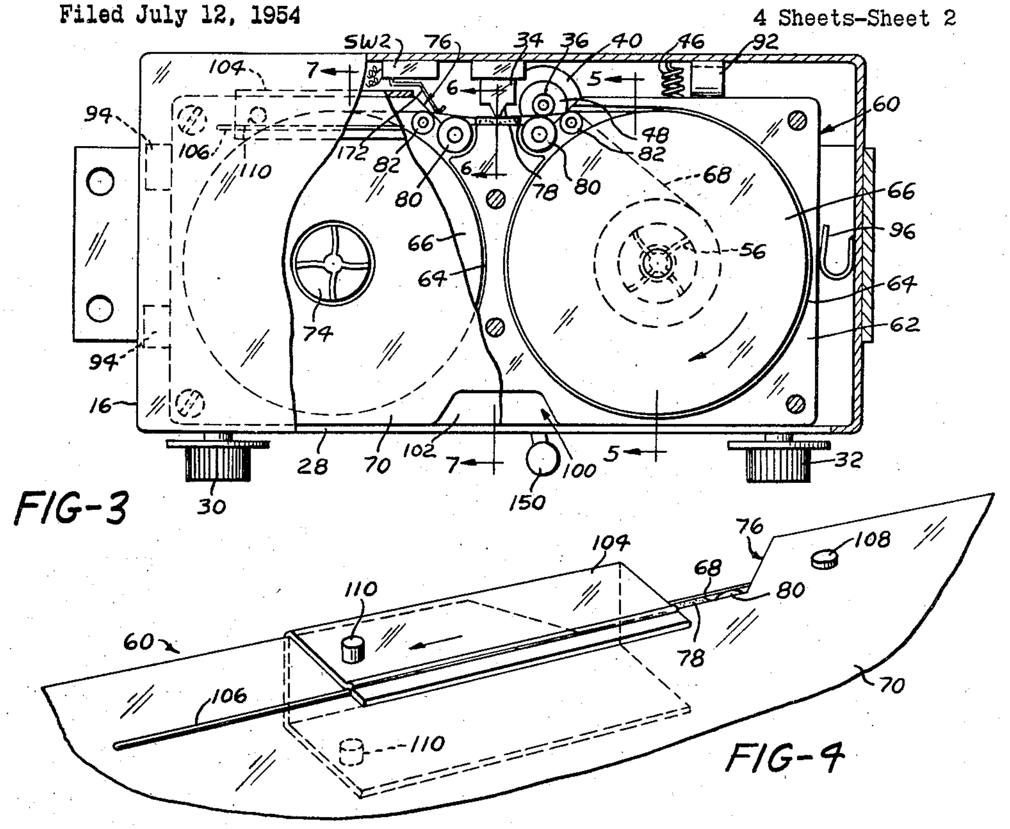
Figure 3 is a plan view of the play back unit with a tape magazine mounted therein with portions of both the play back unit and tape magazine broken away to show the construction thereof.
Figure 4 is a perspective view showing a slide member mounted over the opening of the tape magazine for closing the said opening when the magazine is not in use.

As will best be seen in Figure 3, the cartridge 60 has an opening 76 in the front edge thereof preferably somewhat recessed and into which opening there projects the magnetic pick up head 34 previously described and the capstan 36. The cartridge itself comprises a felt back up member 78 that supports the tape where it is engaged by the pick head and it is also provided with spaced back up rollers 80 that cooperate with the capstan 36 to provide for driving engagement of the tape by the capstan in each of its two respectively inverted positions within the play back unit.

The cartridge 60 also comprises guide pins or posts 82 wich serve accordingly to guide tape 68 toward and away from pick up head 34 for maintaining a high degree of fidelity of pick up of the recorded sound on the tape.

As will be seen in Figure 6, pick up head 34 engages only about one half of the surface of tape 68 and for this reason the cartridge 60 is arranged so that it can be inverted within the play back unit so that the tape can be played first one half and then the other thereby obtaining twice the play time that usually obtains from a tape of a predetermined length.

According to the present invention relatively simple but highly effective means are provided for accurately locating cartridge 60 on platform 26 of the play back unit.

It will be noted, with particular reference to Figures 3 and 5, that the edge of slot 28 through which the cartridge is introduced into the play back unit is slightly higher than platform 26 as is indicated at 90. At the back of the compartment in which the cartridge is located compression spring means 92 are provided so that when the cartridge is inserted into its receiving comreleasable therefrom. In installing or removing the cartridge can be lowered slightly and when released will be held firmly against the small ledge at the front edge of platform 26.

Similarly, fixed abutment means are provided at 94 at one end of the compartment and compression spring means 96 at the opposite end will hold the cartridge firmly against the said abutment means thereby fixedly locating the cartridge laterally of its compartment. Still further compression spring means as at 98 in Figure 5 urge the cartridge downwardly against platform 26. It will be seen that the cartridge is thus accurately located within the receiving compartment while being readily releasable therefrom. In instilling or removing the cartridge from its compartment, an enlarged central portion 99 of slot 28 is availed of together with the finger grip 100 on the front edge of the cartridge which is defined by recess means in the cartridge as indicated at 102 in Figures 3 and 7.

The recessed opening at 76 in the cartridge 60 is adapted for being closed by a slide element 104 which is fitted into the grooves 106 of the cartridge and which has a stopped position where the opening 76 is closed against the abutment pin 108. Pins 110 carried by one end of slide member 104 are receivable in the notches 112 formed in the edges of slot 28 so that the cartridge can only be inserted in the play back unit when the slide member is moved to expose the tape to the play back head.

Referring to Figures 2, 5, 8 and 9, it will be observed that the shaft 54 that carries drive member 56 is journaled in an upper bearing 120 fixed in the bottom wall of a recess 122 formed in platform 26 for receiving drive member 56 while the lower end of shaft 54 is supported in bearing 123 upstanding from the bottom closure member 124 at the bottom of the play back unit. A compression spring 126 and a thrust bearing 128 provide means for urging shaft 54 upwardly to bring drive member 56 into driving engagement with the adjacent spool 66.

Shaft 54 is slotted at 130 to receive a shifting finger 132 carried on an arm 134 that is pivoted at 136 and the free end of which arm is provided with a cam portion 138. A second shifter arm 140 which is pivoted at 146 overlies arm 134 for cooperative engagement therewith. Arm 140 extends through a notched slot 148 in the front wall in the play back unit and terminates in a knob means 150.

The end portion of arm 140 in the region of its pivotal support 146 is formed with a cam nose 152 having a surface adapted for engaging a pin 154 in an extension 156 of supporting bracket 42 for capstan drive motor 40. The arm 140 when moved in such a direction that pin 154 engages the inclined segment 158 of the cam nose, permits spring 46 to move capstan motor 40 forwardly. However, when arm 140 is shifted to bring pin 154 on the raised portion 160 of the cam nose, the capstan motor 40 is pushed backwardly in the play back unit.

As will be seen in Figure 2, arm 140 has three positions marked "play," "stop," and "change" respectively. In the "play" position capstan motor 40 is released to the influence of spring 46 to bring the capstan into pressure engagement with the tape in the cartridge that is in the unit while shaft 54 is released to the influence of spring 126 to cause drive member 56 to drivingly engage the driven spool in the cartridge.

When lever 140 is moved to its "stop" position, the cam nose thereof pushes the capstan and capstan motor backwardly away from the tape and when the arm 140 is moved to its "change" position it rides up the inclined cam portion 138 of lever 134 thus thrusting the lever downwardly and moving the drive member 56 to its retracted position whereby the cartridge in the play back unit can readily be removed and replaced by another.

As will be seen hereinafter arm 140 in its "stop" and "change" positions engages and actuates into "open" position a switch SW–1 which is effective to deenergize capstan motor 40.

The on-off switch 30 generally controls the energization of the device while still another switch SW–2 located adjacent pick up 34 is responsive to the magnetic tape approaching its end position for shutting off the entire unit.

In connection with switch SW–2 the magnetic tape 68 is preferably formed with non-magnetic leaders at the ends which will immediately give a signal that the tape has passed its useful end point but the leader portion of the tape can also be provided with slot means 170, one in each of the said leaders at the opposite ends of the tape and one on each side of the tape and which slots cooperate with operating finger means 172 of switch SW–2 so that the switch will be opened each time the tape reaches its end position. It will be evident that the unit according to this invention can be provided with a complete sound reproducing system including a speaker or phones if desired and thus be operable independently of any radio. However, it is also possible to reduce the reproducing circuit means of the unit to a minimum and arrange it for operation in association with a radio whereby as many of the amplifying stages of the radio are used as is possible.

It is preferred however that the unit according to this invention have at least some audio amplifying stages which will considerably simplify its connection with a radio or a speaker, and enable the reproducing circuit to be closely matched to the tapes thereby substantially eliminating difficulties that might arise in this connection.

Figure 11:
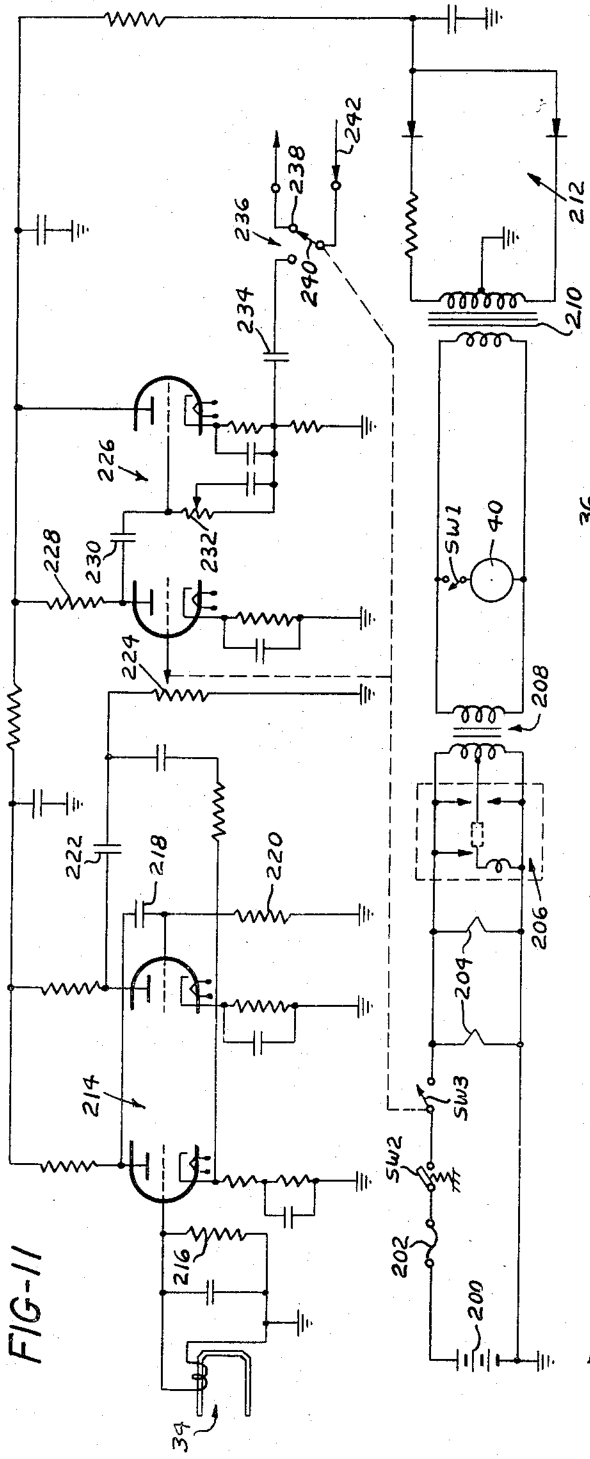
Figure 11 is a schematic illustration of a typical electronic circuit adapted for being embodied in the device according to this invention.
Figure 10:
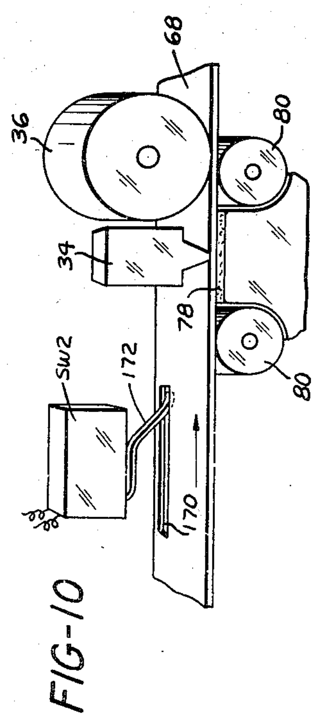
Figure 10 is a fragmentary perspective view showing an arrangement for automatically stopping movement of the tape from the tape magazine as the tape approaches the end whereby the tape will not be pulled from its supporting spools.

Reference to Figure 11 will reveal a typical circuit arrangement but one which, it will be understood, is merely exemplary of a number of different circuit arrangements that could be employed.

The system of Figure 11 consists, in addition to the magnetic pick up head, a pre-amplifier tube, volume and tone control circuits, means for connecting the circuit into a radio, on and off switch means, and a power supply circuit including means for energizing the drive motor 40.

In the circuit of Figure 11 a supply battery is indicated at 200 and it will be understood that suitable means would be provided when the arrangement of this invention is mounted in an automotive vehicle for utilizing the automobile battery as the battery 200. One side of the battery is, of course, grounded and the other side leads through a fuse 202 to the switch SW–2 and then through a switch element SW–3 forming a portion of the on-off and volume control 30. Beyond switch SW–3 there is connected the filament means 204 of the various tubes of the amplifying circuit and a synchronous inverter indicated at 206 is likewise supplied by battery 200 upon closing of switches SW–2 and SW–3.

Synchronous inverter 206 supplies the primary of a transformer 208 which steps up the voltage to an amount, for example, to 110 volts which will operate the capstan drive motor 40 upon closing of switch SW–1 associated therewith. Capstan motor 40 is advantageously a hysteresis type synchronous motor and a combination of this type motor with a synchronous inverter provides for relatively good frequency regulation whereby substantially constant speed of the motor 40 will result. It will be understood however that the motor 40 could be of another type so long as means were included in association therewith for maintaining the speed thereof substantially constant.

The secondary of transformer 208 also supplies the primary of a transformer 210, the secondary of which supplies a full wave rectifier circuit 212 which is connected to supply the operating voltage to the electronic circuit for the remainder of the circuit of Figure 11.

The amplifying portion of the electronic circuit of Figure 11 is substantially conventional and will be seen to comprise in the first stage a dual triode amplifier tube 214 having associated therewith a grid load resistor 216 across which the signal from the magnetic pick up head 34 is impressed.

The signal amplified in the first section of tube 214 is coupled to the second section thereof through a capacitor 218 and a resistor 220. The signal is thus still further amplified in the second section of tube 214 which is coupled to the next stage through a capacitor 222 and the volume control resistor 224.

The second stage also consists of a dual triode tube 226 with the first section thereof being biased by the signal developed across the volume control resistor 224.

The load resistor for the first section of tube 226 as indicated at 228 and the signal developed on the plate of the first section of this tube is transferred through a capacitor 230 and the tone control resistor 232 to the grid of the second section of tube 226 which is a cathode follower.

The cathode follower arrangement operates through capacitor 234 to supply a signal to one terminal of a switch 236 forming a portion of the on-off-volume control 30 which switch also has another terminal at 238 and a switch arm at 240 that is connected by wire 242 to the correct radio circuit. Movement of switch arm 240 will either connect the amplifying system of the play back unit into the car radio or will disconnect the unit from the car radio and restore the car radio to operative condition.

I claim:

1. In combination; a cartridge having two spools therein with a magnetic tape leading therebetween, an aperture in one edge of the cartridge exposing one face of the tape between the spools and means in the region of the aperture supporting and guiding the tape, a unit comprising a frame having a compartment therein with a slot in the front wall of the frame for admitting a cartridge into the compartment, a magnetic pick up head in the compartment positioned to engage the exposed face of the tape of a cartridge therein, a rotatable capstan in the compartment resiliently engaging said exposed face of the tape, a slide on the cartridge movable thereon to open or close said aperture, and means on the slide cooperating with said unit operable to prevent insertion of the cartridge into working position in the unit unless the slide is in its aperture open position.

2. In combination; a cartridge having two spools therein with a magnetic tape leading therebetween, said cartridge having aperture means exposing a portion of the tape, each spool having a drive hub accessible through a different wall of the cartridge, a unit having a compartment for receiving the cartridge including a magnetic pick up head and a drive capstan to engage the exposed portion of the tape between the spools, a reciprocable drive member in the unit to engage one of the spool hubs, a first shifter element for shifting said drive member into and out of engagement with said hub, a second shifter element to move the capstan to and from engagement with the tape, and means for operating the shifter elements together into and out of their operative positions.

3. In combination; a cartridge having two spools therein with a magnetic tape leading therebetween, said cartridge having aperture means exposing a portion of the tape, each spool having a drive hub accessible through a different wall of cartridge, a unit having a compartment for receiving the cartridge including a magnetic pick up head and a drive capstan to engage the exposed portion of the tape between the spools, a reciprocable drive member in the unit to engage one of the spool hubs, a first shifter element for shifting said drive member into and out of engagement with said hub, a second shifter element to move the capstan to and from engagement with the tape, and means for operating the shifter elements together into and out of their operative positions, there being a drive motor for the capstan and drive member, and switch means in the motor circuit positioned to be opened in response to movement of the shifter elements.

References Cited in the file of this patent

UNITED STATES PATENTS

| | | |
|---|---|---|
| 2,005,404 | Wittel | June 18, 1935 |
| 2,032,190 | Thomas | Feb. 25, 1936 |
| 2,513,616 | Begun | July 4, 1950 |
| 2,543,483 | Barrett | Feb. 27, 1951 |
| 2,560,234 | Masterson | July 10, 1951 |
| 2,572,157 | Kay | Oct. 23, 1951 |
| 2,572,596 | Camras | Oct. 23, 1951 |
| 2,603,721 | Camras | July 15, 1952 |
| 2,655,563 | Connell | Oct. 13, 1953 |
| 2,681,950 | Owens | June 22, 1954 |
| 2,702,834 | Golle | Feb. 22, 1955 |
| 2,712,448 | Schroter | July 5, 1955 |

FOREIGN PATENTS

| | | |
|---|---|---|
| 698,402 | Great Britain | Oct. 14, 1953 |